US 8,186,618 B2

(12) United States Patent
Beaufort

(10) Patent No.: US 8,186,618 B2
(45) Date of Patent: May 29, 2012

(54) DEVICE FOR ATTACHING AN AIRCRAFT ENGINE

(75) Inventor: Jacques Beaufort, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 812 days.

(21) Appl. No.: 12/298,328

(22) PCT Filed: May 14, 2007

(86) PCT No.: PCT/EP2007/054617
§ 371 (c)(1),
(2), (4) Date: Oct. 24, 2008

(87) PCT Pub. No.: WO2007/131979
PCT Pub. Date: Nov. 22, 2007

(65) Prior Publication Data
US 2009/0200418 A1 Aug. 13, 2009

(30) Foreign Application Priority Data
May 16, 2006 (FR) ..................................... 06 51753

(51) Int. Cl.
*B64D 27/26* (2006.01)
(52) U.S. Cl. ......................................... 244/54; 248/554
(58) Field of Classification Search ................ 244/53 R, 244/54, 55; 248/554; 60/796
See application file for complete search history.

(56) References Cited

U.S. PATENT DOCUMENTS

| 2,471,118 | A | * | 5/1949 | Patterson ......................... 244/54 |
| 3,831,888 | A | * | 8/1974 | Baker et al. ...................... 244/54 |
| 5,064,144 | A | * | 11/1991 | Chee ................................ 244/54 |
| 6,059,227 | A | | 5/2000 | Le Blaye et al. |
| 6,173,919 | B1 | * | 1/2001 | Le Blaye ........................... 244/54 |
| 6,758,438 | B2 | * | 7/2004 | Brefort et al. .................... 244/54 |
| 7,281,848 | B2 | * | 10/2007 | Kendall et al. ................. 378/193 |
| 7,438,262 | B2 | * | 10/2008 | Chamberlain ................... 244/54 |
| 7,708,224 | B2 | * | 5/2010 | Aho-Mantila et al. .......... 244/54 |
| 2003/0066928 | A1 | | 4/2003 | Brefort et al. |
| 2003/0118399 | A1 | * | 6/2003 | Schilling et al. .............. 403/337 |

FOREIGN PATENT DOCUMENTS

| EP | 0 934 877 | 8/1999 |
| EP | 1 300 337 | 4/2003 |
| FR | 2 770 486 | 5/1999 |

* cited by examiner

*Primary Examiner* — Rob Swiatek
*Assistant Examiner* — Marisa Conlon
(74) *Attorney, Agent, or Firm* — Oblon, Spivak, McClelland, Maier & Neustadt, L.L.P.

(57) ABSTRACT

A device for attaching an aircraft engine including a rigid structure forming a structure box, and a device for absorbing thrust loads including a main fitting fixedly mounted on one of the spars forming the structure box, by a fixing mechanism. The fixing mechanism includes a fixing peg mounted on the spar and including a main portion located on the outside relatively to the box, the fitting being crossed by the portion of the peg and pressed against the spar by a bell-shaped supporting washer surrounding the main portion and stressed by a screw crossing it, the latter being screwed into a barrel nut housed in a bore made within the main portion.

10 Claims, 3 Drawing Sheets

DEVICE FOR ATTACHING AN AIRCRAFT ENGINE

TECHNICAL FIELD

The present invention generally relates to a device for attaching an aircraft engine, for example intended to be interposed between an aircraft wing and the relevant engine, as well as to an engine assembly comprising such an attachment device.

The invention may be used on any type of aircraft equipped with turbojet engines or turboprop engines.

This type of mounting device also called an engine pylon suspension attachment or an <<Engine Mounting Structure >> (EMS), may indifferently be used for suspending an engine below the wing of the aircraft, mounting this engine above this same wing, or even for adding this engine to the rear portion of the fuselage of the aircraft.

STATE OF THE PRIOR ART

Such an attachment device is indeed usually provided for forming the connection interface between a turbine engine and a wing of the aircraft. It allows transmission of the forces generated by its associated turbine engine, to the structure of this aircraft and also allows transfer of the fuel, of the electric, hydraulic systems and of air between the engine and the aircraft.

In order to ensure transmission of the forces, the attachment device includes a rigid structure, often of the <<structure box >> type, i.e. formed by the assembly of upper and lower spars and of side panels/spars connected together via transverse ribs.

On the other hand, the device is provided with attachment means interposed between the turbine engine and the rigid structure, these means globally including two motor attachment members as well as a device for absorbing thrust loads generated by the turbine engine.

In the prior art, this thrust-load-absorbing device comprises for example two side link rods connected to a rear portion of the fan case of the turbine engine on the one hand, and to a rear attachment member fixed on the central case of the latter on the other hand.

In the same way, the attachment device also includes another series of attachment members forming a mounting system interposed between the rigid structure and the wing of the aircraft, this system usually consisting of two or three attachment members.

Finally, the pylon is provided with a secondary structure providing segregation and maintaining the systems while supporting aerodynamic fairings.

In order to provide the fixing of the device for absorbing thrust loads onto the rigid structure of the attachment pylon, also designated as a primary structure, this device generally includes a main fitting fixedly mounted on one of the spars of the structure box, a said supporting spar. Suitable fixing means are therefore used for allowing such an assembly of the main fitting on the supporting spar, these fixing means being notably able to integrate components of the type of traction screw and barrel nut with a deformed flange, ensuring tightening of the screw, screwed into this barrel nut.

If the use of barrel nuts proves to be interesting because of the high safety which they provide, a drawback related to this use resides in the fact that these nuts are generally located inside the rigid structure forming a structure box, thereby making them accessible with difficulty during the numerous inspection calls which this type of nut requires. In order to have access to these barrel nuts, the operator is actually forced to pass through orifices with small dimensions, also called <<gates >>, made in the side panels/spars forming the structure box. As such, it is noted that the access difficulties encountered during inspection calls are further amplified when the barrel nuts also cooperate with a transverse rib of the rigid structure forming a structure box, a solution which however is often retained for obvious reasons of reinforced mechanical strength.

Thus, it is clear that the operations for inspections and for replacing barrel nuts located inside the structure box are clearly not optimized, and consequently very penalizing in terms of time.

Of course, such screw/barrel nut assemblies may also be encountered for fixing the main fittings of the engine attachment members on a given supporting spar of the rigid structure, which even further emphasizes the drawbacks mentioned above.

OBJECT OF THE INVENTION

The object of the invention is therefore to propose an attachment device and a motor assembly comprising such a device which find a remedy to the drawbacks mentioned above, relating to prior art achievements.

To do this, the object of the invention is a device for attaching an aircraft engine including a rigid structure and means for attaching the engine on the rigid structure, this rigid structure forming a structure box including spars connected together via transverse ribs, the attachment means including a plurality of engine attachment members as well as a device for absorbing thrust loads generated by the engine, at least one of the components taken from the thrust-load absorbing device and the engine attachment members having a main fitting fixedly mounted on one of the spars, forming a supporting spar, by fixing means including a screw as well as a barrel nut with a deformed flange ensuring the tightening of the screw screwed into this barrel nut. According to the invention, the fixing means further comprise a fixing peg fixedly mounted on the supporting spar and having a main portion located on the outside relatively to the rigid structure, the main fitting being crossed by the main portion of the fixing peg and pressed against the supporting spar via a bell-shaped supporting washer surrounding the main portion and stressed by the screw which passes through it, the latter being screwed into the barrel nut housed in a bore made within the main portion of the fixing peg.

Thus, the invention provides the advantage of housing the barrel nut outside the rigid box-forming structure, which makes it easily accessible for an operator who wishes to carry out routine inspections or a replacement of this same barrel nut. The aforementioned operations may therefore be widely optimized as compared to those encountered in the prior art, which is advantageously expressed by a gain in terms of time and ease of intervention for the operator.

Naturally, for fixing the main fitting of one of the motor attachment members or of the thrust-load absorbing device, provision may be made for several assemblies of this type, i.e. each incorporating a fixing peg, also called a shearing peg, in which is housed the barrel nut cooperating with the screw used for tightening the bell-shaped supporting washer, which is as for it provided for pressing this main fitting against the supporting spar of the rigid box-forming structure.

Preferably, the barrel nut is entirely located beyond an end of a bore of the main fitting crossed by the fixing peg, in a longitudinal direction of this same fixing peg. In other words, the barrel nut housed in the fixing peg is located with sufficient clearance away from the main fitting so that it may be removed from the fixing peg, without requiring the removal of the main fitting located on the outside relatively to the rigid box-forming structure. Indeed, in such a case, it is then only sufficient to remove the screw and the bell-shaped supporting washer in order to be able to have direct access to the barrel nut, which may then be easily removed from its associated housing by sliding.

With the same purpose, provision may be made for having the bore made within the main portion of the fixing peg and used as a housing for the barrel screw, entirely located beyond an end of the bore of the main fitting crossed by the fixing peg, in a longitudinal direction of this same fixing peg.

Still preferentially, it is provided that the fixing peg further includes a secondary fixing portion integral with the main portion and crossing the supporting spar, this secondary fixing portion having a threaded end screwed into a nut located inside the rigid box-forming structure. Thus, it is by the cooperation between this nut and the threaded end that the fixing peg is again found fixedly mounted on the supporting spar, against which a shoulder of the main portion of this peg may be pressed in order to provide the tightening.

Further, the secondary fixing portion also passes through a sole of one of the transverse ribs of the rigid structure, against which the nut is pressed. By integrating one of the transverse ribs into the assembly, the maintaining of the main fitting relatively to the rigid structure may be reinforced, and better transmission of the forces may be provided from the engine and directly towards the wing or the rear portion of the fuselage of the aircraft.

Further, the object of the invention is also an engine assembly comprising an engine such as a turbine engine, and a device for attaching this engine, the attachment device being such as the one which has just been described.

Finally, the object of the invention is also an aircraft including at least such an engine assembly, assembled on a wing or on a rear portion of the fuselage of this aircraft.

Other advantages and characteristics of the invention will become apparent in the non-limiting detailed description below.

BRIEF DESCRIPTION OF THE DRAWINGS

This description will be made with regard to the appended drawings wherein.

DETAILED DESCRIPTION OF PREFERRED EMBODIMENTS

Figure 1:
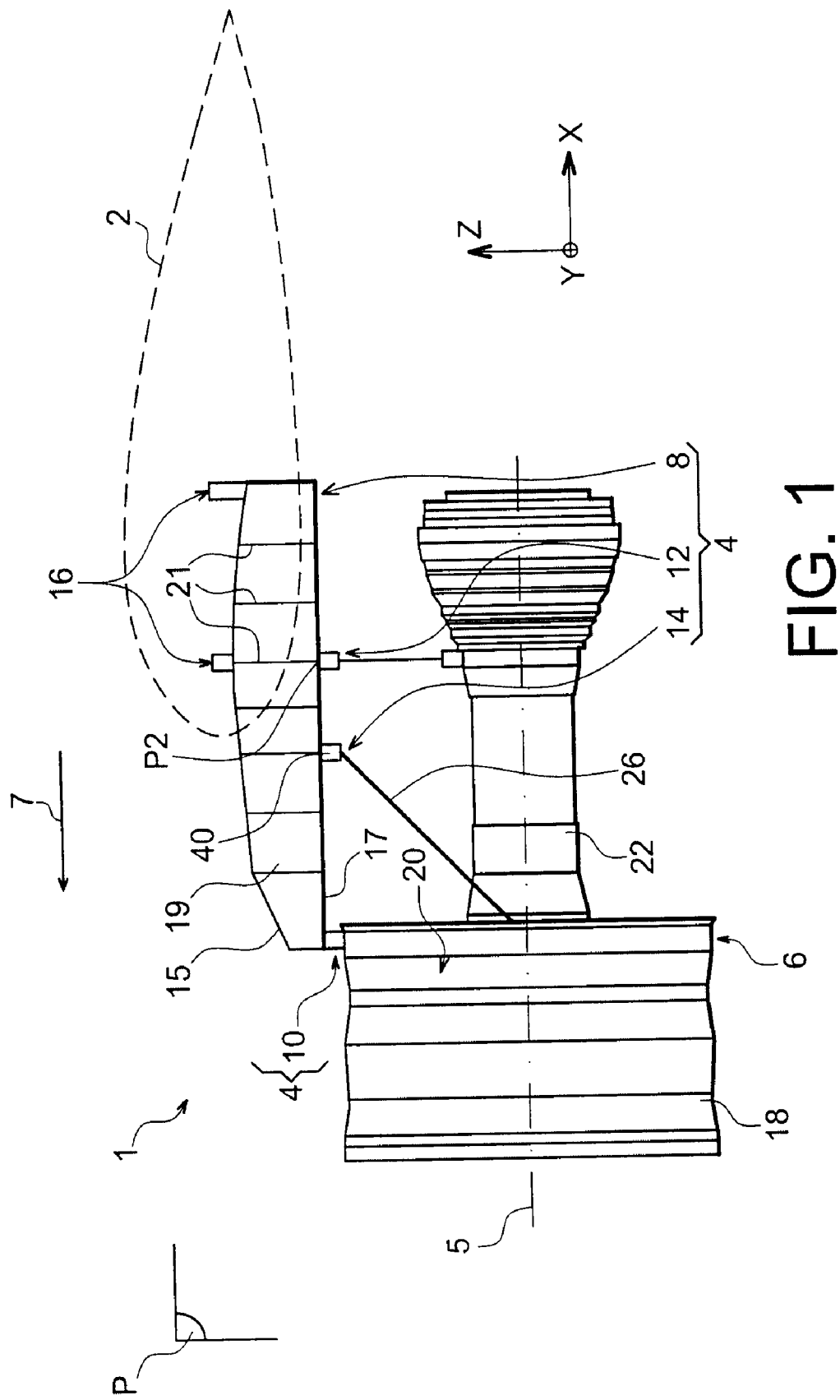
FIG. 1 illustrates a side view of an engine assembly for an aircraft, comprising an attachment device according to a preferred embodiment of the present invention.

With reference to FIG. 1, an engine assembly 1 for an aircraft is seen, intended to be fixed under a wing 2 of this aircraft only illustrated schematically in dotted lines for sake of clarity, this assembly 1 including an attachment device 4 according to a preferred embodiment of the present invention, as well as an engine 6 such as a turbine engine, attached under this device 4.

Globally, the attachment device 4 includes a rigid structure 8 bearing means for attaching the engine 6, these attachment means having a plurality of engine attachment members 10, 12, as well as a device for absorbing thrust-loads 14 generated by the engine 6.

Indicatively, it is noted that the assembly 1 is intended to be surrounded by a pod (not shown), and that the attachment device 4 includes another series of attachment members 16 with which the suspension of this assembly 1 may be provided under the wing 2 of the aircraft.

In the whole description which follows, by convention, the longitudinal direction of the device 4 is called X, which may also be assimilated to the longitudinal direction of the turbine engine 6, this direction X being parallel to a longitudinal axis 5 of this turbine engine 6. On the other hand, the direction oriented transversely relatively to the device 4 is called Y and may also be assimilated to the transverse direction of the turbine engine 6, and Z is the vertical or height direction, these three directions X, Y and Z being orthogonal to each other.

On the other hand, the terms <<front>> and <<rear>> are to be considered relatively to an advancing direction of the aircraft, encountered as a result of the thrust exerted by the turbine engine 6, this direction being schematically illustrated by the arrow 7.

In FIG. 1, both of the engine attachment members 10, 12, the series of attachment members 16, the thrust-load absorbing device 14, and the rigid structure 8 of the attachment device 4 may be seen. The other constitutive components not shown of this device 4, such as the secondary structure providing segregation and maintaining the systems while supporting aerodynamic fairings, are standard components identical or similar to those encountered in the prior art, and known to one skilled in the art. Therefore, no detailed description will be made thereof.

On the other hand, it is pointed out that the turbine engine 6 has in the front a fan case 18 of large size delimiting a fan annular channel 20, and includes towards the rear a central case 22 of smaller size, containing the core of this turbine engine. The cases 18 and 20 are of course integral with each other.

As this may be seen in FIG. 1, the engine attachment members 10, 12 of the device 4 are provided so as to be two in number, and designated as front engine attachment member and rear engine attachment member respectively.

In this preferred embodiment of the present invention, the rigid structure 8 has the shape of a structure box extending from the rear to the front, substantially along the X direction.

The structure box 8 then assumes the shape of a pylon of a design similar to the one usually observed for turbine engine pylon suspension attachments, notably in the sense that it is made by the assembling of an upper spar 15, of a lower spar 17, and of two side panels/spars 19 (only one being visible because of the side view), these components 15, 17, 19 being connected together via transverse ribs 21 each globally assuming the shape of a rectangle. Thus, the ribs 21 extend in YZ planes, the spars 15, 17 roughly extend in XY planes, and the side panels 19 in XZ planes.

The attachment means of this preferred embodiment first of all include the front engine attachment member 10 interposed between a front end of the rigid structure 8, which may assume the shape of a pyramid, and an open portion of the fan case 18. On the other hand, the rear engine attachment member 12 is as for it interposed between the rigid structure 8 and the central case 22 of the turbine engine 6.

The thrust-load absorbing device 14 is fixed to the rigid structure 8, also called a primary structure, in a point of the lower spar 17 of the latter located between both fixing points of the front 10 and rear 12 engine attachment members in the X direction.

Globally, the thrust-load absorbing device 14 has two side link rods for absorbing the thrust loads 26 (only one being visible in FIG. 1), each of these link rods including a front end connected to the fan case 18, for example on or close to a horizontal middle plane of the turbine engine 6.

The rear portion of this thrust-load absorbing device 14 will now be detailed with reference to FIG. 2.

In this figure, it may be seen that both side link rods 26, located on either side of the vertical middle plane P of the attachment device also corresponding to a vertical middle plane of the turbine engine, each have a rear end connected through a joint to a rudder control bar 28, via a standard axis system (not shown).

The rudder control bar 28 is jointed on a joint axis 32 positioned between both of the aforementioned axis systems, which are as for them, positioned symmetrically relatively to the vertical middle plane P of the device 4. Moreover, the joint axis 32 may be an integral part of a main fitting 34 of the thrust-load absorbing device 14, and may consist of two half-cylinders each belonging to a fitting component of the double main fitting 34 shown in FIG. 2. In a way known to one skilled in the art, it may also be seen that the lower sole 36 is supported against an inner surface of the supporting spar 17, while the outer surface of the latter conforms with the main fitting 34, which therefore preferably assumes the shape of a double fitting.

Figure 2:
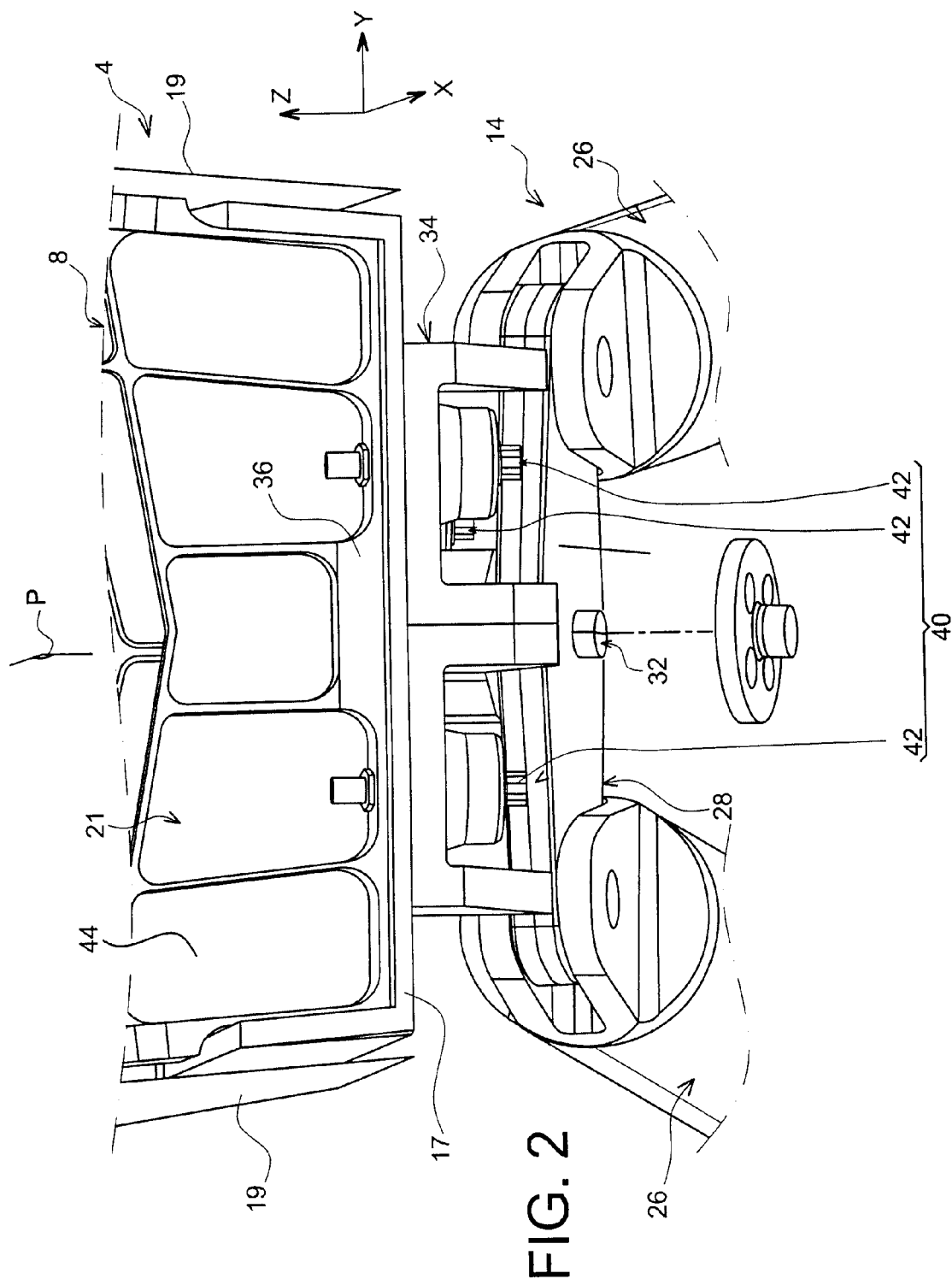
FIG. 2 illustrates a partial perspective view of the attachment device shown in FIG. 1.

The mounting on the lower supporting spar 17 of this main fitting 34, also called rudder control bar supporting fitting, is achieved with fixing means specific to the present invention, which are referenced as 40 in FIG. 2. As such, it may be seen that several identical or similar assemblies 42 may form said fixing means 40, these assemblies 42, for example provided so as to be four in number (only three of them being visible in FIG. 2), which may be positioned symmetrically relatively to the middle vertical plane P, and distributed equitably on either side of a transverse plane 44 of the rib 21. Nevertheless, only one of these assemblies 42 will be described hereafter, with reference to FIG. 3.

Figure 3:
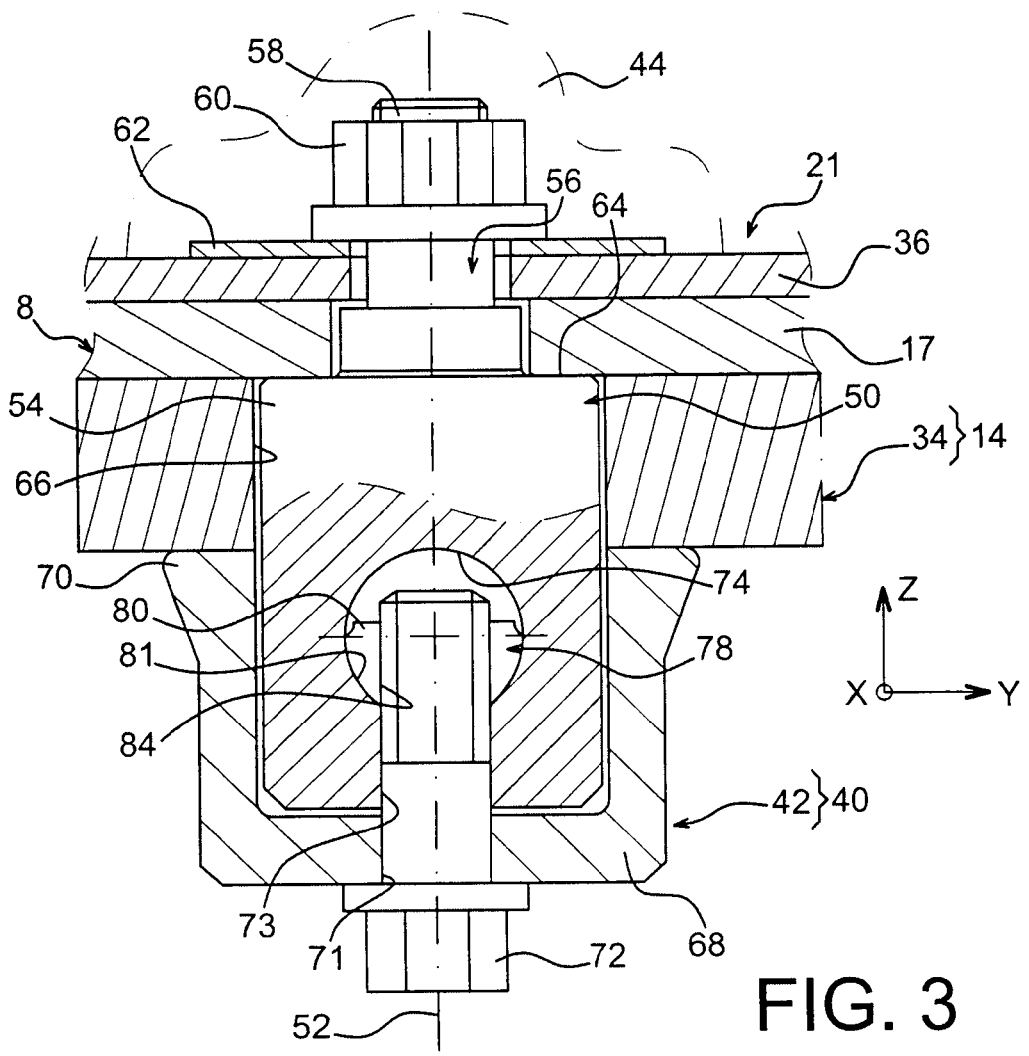
FIG. 3 illustrates a sectional view of fixing means belonging to the attachment device shown in FIGS. 1 and 2, and being used for mounting the main fitting of the thrust-load absorbing device, on the rigid structure of this attachment device.

Therefore with reference to FIG. 3, one of the assemblies 42 may actually be seen, belonging to the fixing means 40 used for mounting the main fitting 34 of the device 14 on the rigid structure 8, and in particular on the lower supporting spar 17 in the considered and preferred case when the engine assembly is intended to be hung under the wing of the aircraft.

The assembly 42 first of all includes a fixing peg 50, also called a shearing peg, having a longitudinal axis 52 which is globally laid out along the Z direction, and therefore orthogonal to the supporting spar 17. As an indication, the whole of the assembly components 42 described hereafter are concentric, all centred on this same axis 52 of the peg 50, defining a longitudinal direction of the latter.

More specifically, the peg 50 includes a main portion 54 forming a lower portion, as well as a secondary fixing portion 56 integral with the portion 54 and located below the latter, and preferably made in a single piece with this same main portion 54.

The secondary fixing portion 56 having an average diameter with a smaller size than the one of the main portion 54, has a threaded free upper end 58, screwed into a nut 60 located inside said rigid structure 8. As this is visible in FIG. 3, this nut 60 is pressed against a lower sole 36 of one of the transverse ribs 21 itself pressed against the spar 17, and is possibly coupled with a standard anti-rotation system 62 interposed between a lower supporting portion of this nut and the lower sole 36. In this respect, it is indicated that the sole 36 with an upper sole and two side soles (not shown) of this rib, is part of an assembly forming the outer frame of the rectangular rib, on which are mounted the spars/panels of the structure box and within which is found the transverse flank 44 of the rib.

On this subject, it may be provided that the lower supporting portion of the nut has a side wall including a planar portion pressed flat against said transverse flank 44 of the rib 21, thereby allowing this nut to be blocked in rotation along its axis by means of this flat support. Thus, the mounting of the peg 50 is carried out by screwing its threaded end 58 into the rotationally blocked nut 60.

From its threaded end 58 cooperating with the nut 60 pressed against the sole 36, the secondary fixing portion extends downwards along the axis 52 successively passing through the anti-rotation system 62, the sole 36 and the lower supporting spar 17, all these parts each naturally having a bore for letting through the peg.

At the lower end of the secondary portion 56, the peg 50 extends downwards with the main portion 54 having a substantially cylindrical shape with a circular section and preferentially not threaded.

At the upper end of the main portion 54, the latter defines a shoulder surface 64 oriented along an YZ plane and coming into contact with an outer surface of the spar 17. This notably implies that it may be considered that this main portion 54 is located entirely on the outside relatively to the structure box 8, on which the peg 50 is therefore fixedly assembled by means of two opposite supports along the Z direction between the nut 60 and the sole 36 on the one hand, and the shoulder surface 64 and the spar 17 on the other hand.

Always with reference to FIG. 3, it may be seen that the main fitting 34 of the thrust-load absorbing device 14 has a bore 66 along the axis 52, which is crossed by the main portion 54 therefore protruding downwards from this bore, in the Z direction.

In order to provide the pressing of the main fitting 34 against the supporting spar 17, the assembly 42 comprises a bell-shaped supporting washer 68, the bell opening upwards so that a lower portion of the main portion 54, which is therefore surrounded by this same bell, may be housed therein.

A circular end lip 70 of the bell is pressed against a lower surface of the main fitting opposite to an upper surface pressed against the spar 17, which therefore allows this fitting 34 to be pressed against this spar 17. Further, the bell-shaped washer 70 centred on the axis 52 is itself stressed in the Z direction via a screw 72 also centred on the axis 52, as this will be described below.

Figure 4:
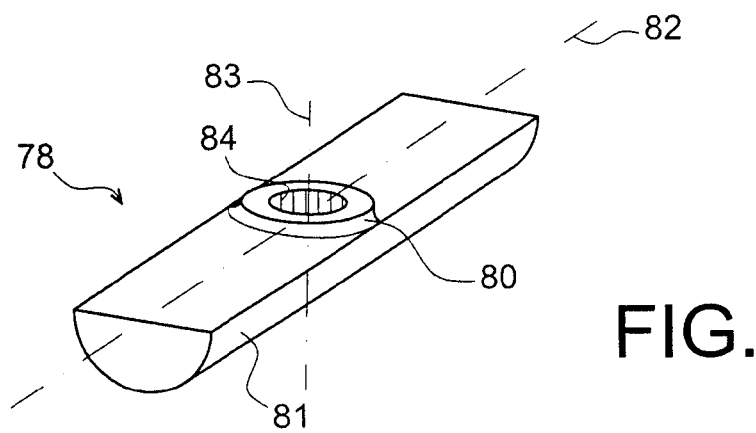
FIG. 4 illustrates a barrel nut belonging to the fixing means shown in FIG. 3, being used for mounting the main fitting of the thrust-load absorbing device, on the rigid structure of the attachment device.

Actually, this screw 72 has a head oriented downwards, pressed against an outer surface of the bell-shaped washer 68. It then extends upwards by successively passing through the washer 68 and a lower portion of the main portion 54 of the peg 50, each provided with a bore 71, 73 provided for this purpose along the Z direction. Next, the screw 72 has its threaded end portion which opens into another bore 74 made in the main portion 54 of the peg 50, along a direction orthogonal to its longitudinal axis 52, such as for example the X direction, as this is illustrated. Of course, this assembly is allowed by providing that the bore 73 for letting through the screw opens into the bore 74 passing through the peg 50, and in which a barrel nut 78 is housed, as this will now be described with reference to FIGS. 3 and 4.

Indeed, in the bore 74 with a circular cross-section, provision is made for a barrel nut 78 with a deformed flange 80 ensuring the tightening of the screw 72 screwed into this nut, the latter assuming any standard shape known to one skilled in the art. It is recalled that a barrel nut is generally a nut which has a cylindrical outer surface 81, the axis 82 of which (FIG. 4) is perpendicular to the axis 83 of the tapped hole 84 which crosses it, this axis 83 in the relevant assembly coinciding with the axis 52 of the peg 50. A barrel nut may be made depending on the case in one or two parts. In the second case, it comprises a floating nut, mounted in a housing formed in a cylindrical nut support.

Thus, with the barrel nut 78, blocked by the bore 74 in rotation and in translation along the axis 83 of the tapped hole 84, the screw 72 may be easily mounted, a screw intended to be screwed into this same tapped hole 84 extending with the for example elliptically deformed flange 80, so as to allow blocking in rotation along the direction Z of this screw 72.

One of the particularities associated with this assembly 42 is therefore that the barrel nut 78 is located on the outside relatively to the structure box 8, so that its access does not pose any particular problem to the operators. In this respect, in order to allow easy extraction of this nut 78 housed in the bore 74, it is provided that this nut 78 is entirely located beyond an end of the bore 66 of the main fitting crossed by the portion 54, in the Z direction and downwards, i.e. in the direction from the supporting spar 17 towards the main fitting 34. The nut 78 is therefore located with sufficient clearance away from the main fitting 34 so that it may be removed from the bore 74 indifferently opening out or passing through it, without requiring the removal of this main fitting 34. In such a case, it is actually sufficient to only remove the screw 72 and the bell-shaped supporting washer 68 in order to be able to have direct access to the nut 78, which may then be easily extracted from its housing by sliding.

As this is seen in FIG. 3, one preferably manages to have the entirety of the bore 74 provided for housing the bells nut 78, entirely located beyond an end of the bore 66 of the main fitting crossed by the portion 54, in the Z direction and downwards, i.e. in the direction from the supporting spar 17 towards the main fitting 34.

Of course, various modifications may be provided by one skilled in the art to the attachment device 4 and to the engine assembly 1 which have just been described, exclusively as non-limiting examples. In this respect, it may notably be indicated that if the engine assembly 1 was shown in a suitable configuration so that it is hung under the wing of the aircraft, this assembly 1 might also exist in a different configuration allowing it to be mounted above this same wing, or even on a rear portion of the fuselage of this aircraft. Further, if the fixing means specific to the present invention have been described for assembling the main fitting of the thrust-load absorbing device on the rigid structure of the mounting structure, these same means might also/alternatively be used for providing the assembling of the main fitting of an engine attachment member on this same rigid structure without departing from the scope of the invention.

The invention claimed is:

1. A device for attaching an aircraft engine comprising:
a rigid structure; and
means for attaching the engine on the rigid structure, the rigid structure forming a structure box including spars connected together via transverse ribs, the means for attaching including a plurality of engine attachment members and a device for absorbing thrust loads generated by the engine, at least one of the thrust-load absorbing device or the engine attachment members having a main fitting fixedly mounted on one of the spars forming a supporting spar, by fixing means including a screw and a barrel nut with a deformed flange providing tightening of the screw screwed into the barrel nut,
wherein the fixing means further comprises a fixing peg fixedly mounted on the supporting spar and including a main portion located on the outside relative to the rigid structure, the main fitting being crossed by the main portion of the fixing peg and pressed against the supporting spar via a bell-shaped supporting washer surrounding the main portion and stressed by the screw crossing it, the latter being screwed into the barrel nut, which is housed in a bore made within the main portion of the fixing peg.

2. The attachment device according to claim 1, wherein the barrel nut is entirely located beyond an end of a bore of the main fitting crossed by the fixing peg, in a longitudinal direction of the fixing peg.

3. The attachment device according to claim 1, wherein the bore made within the main portion of the fixing peg, and used for housing the barrel nut, is entirely located beyond an end of a bore of the main fitting crossed by the fixing peg, in a longitudinal direction of the fixing peg.

4. The attachment device according to claim 1, wherein the fixing peg further includes a secondary fixing portion integral with the main portion and crossing the supporting spar, the secondary fixing portion including a threaded end screwed into a nut located inside the rigid box-forming structure.

5. The attachment device according to claim 4, wherein the secondary fixing portion also crosses a sole of one of the transverse ribs of the rigid structure, against which the nut is pressed.

6. The attachment device according to claim 1, wherein:
the barrel nut slides into the bore made within the main portion of the fixing peg, and is retained therein by the bell-shaped washer, which covers the main portion of the fixing peg and engages the main fitting to press the main fitting against the supporting spar when the screw is screwed into the barrel nut, such that the barrel nut is accessible from the outside of the rigid structure and is housed in the bore entirely beyond an end of a bore of the main fitting through which the fixing peg extends.

7. The attachment device according to claim 6, wherein the barrel nut is provided in the bore such that only the screw and the bell-shaped washer need to be removed in order to have direct access to the barrel nut.

8. The attachment device according to claim 7, wherein the barrel nut has a semi-cylindrical shape which slides into the bore made within the main portion of the fixing peg in a direction of a long axis of the semi-cylindrical shape.

9. An engine assembly comprising:
an engine; and
a device for attaching the engine, wherein the attachment device is a device according to claim 1.

10. An aircraft comprising:
at least one engine assembly according to claim 9, assembled on a wing or on a rear fuselage portion of the aircraft.

* * * * *